United States Patent [19]
Martin

[11] 3,858,911
[45] Jan. 7, 1975

[54] PIPING SYSTEM
[75] Inventor: Lee Martin, Elkhart, Ind.
[73] Assignee: Nibco, Inc., Elkhart, Ind.
[22] Filed: Dec. 6, 1972
[21] Appl. No.: 312,474

[52] U.S. Cl.................. 285/173, 29/504, 285/287, 285/422
[51] Int. Cl. ...................... F16l 55/00, F16l 13/08
[58] Field of Search ............ 285/287, 422, 173, 55; 29/503, 474.6, 196.5, 191, 504

[56] References Cited
UNITED STATES PATENTS

| | | | |
|---|---|---|---|
| 2,050,728 | 8/1936 | Ost.................................. | 285/287 |
| 2,105,405 | 1/1938 | Chase ........................... | 285/287 X |
| 2,258,327 | 10/1941 | Kramer.............................. | 29/191 |
| 2,547,947 | 4/1951 | Kleis et al......................... | 29/196.5 X |
| 3,259,148 | 7/1966 | Krengel et al. ................ | 29/196.5 X |
| 3,467,765 | 9/1969 | Croft................................. | 29/503 X |
| 3,534,986 | 10/1970 | Hartmann et al.............. | 285/287 X |

Primary Examiner—Jordan Franklin
Assistant Examiner—Moshe I. Cohen
Attorney, Agent, or Firm—Hobbs & Green

[57] ABSTRACT

A piping system consisting of a thin walled steel pipe having a galvanized coating on the external and internal surfaces and a plain end, a copper or bronze fitting, valve, adapter or the like, and having a cup for receiving the plain end of the pipe, and a metallurgical bond formed by soldering or brazing between the cup and the galvanized coating on the plain end of the pipe. Notwithstanding the lower thermal conductivity constant of the steel pipe, the relatively small mass afforded by the thin walled structure of the pipe minimizes the difference in the effect of thermal conductivity between the steel and the copper or bronze fitting, and hence results in an effective, reliable joint in a minimum amount of heating and cooling time. The joint between the thin walled pipe and the copper or bronze fitting can easily be made using standard soldering and brazing technique and compounds, the system is adapted to perform effectively under the same conditions as the conventional copper piping system and at a lower installation cost.

7 Claims, 3 Drawing Figures

PATENTED JAN 7 1975 3,858,911
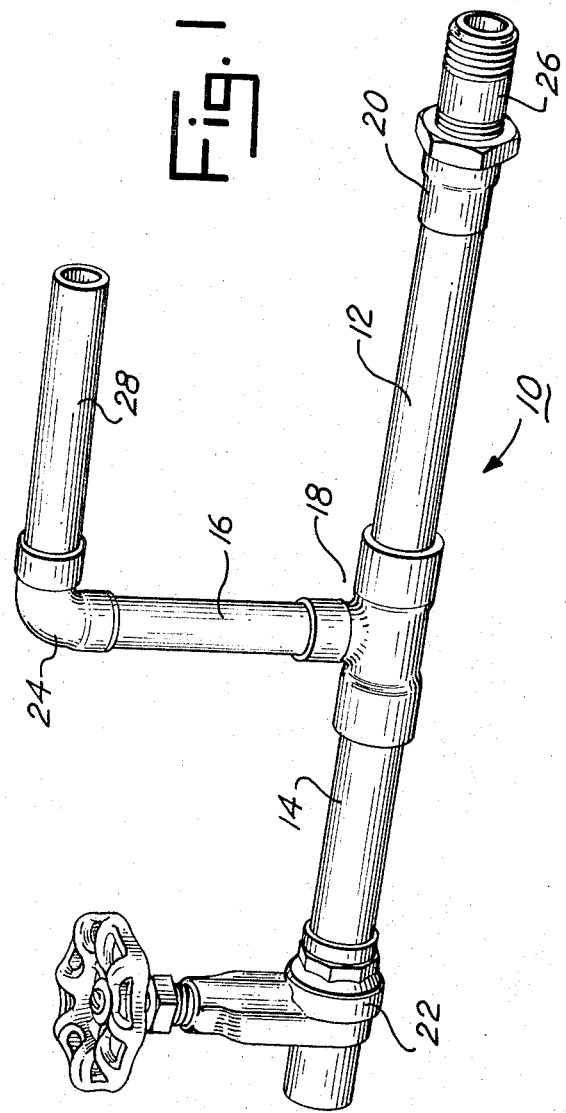
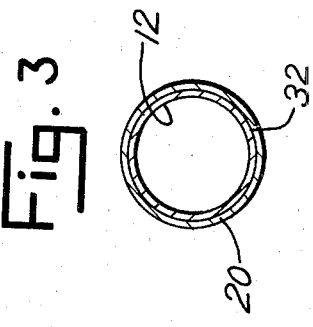
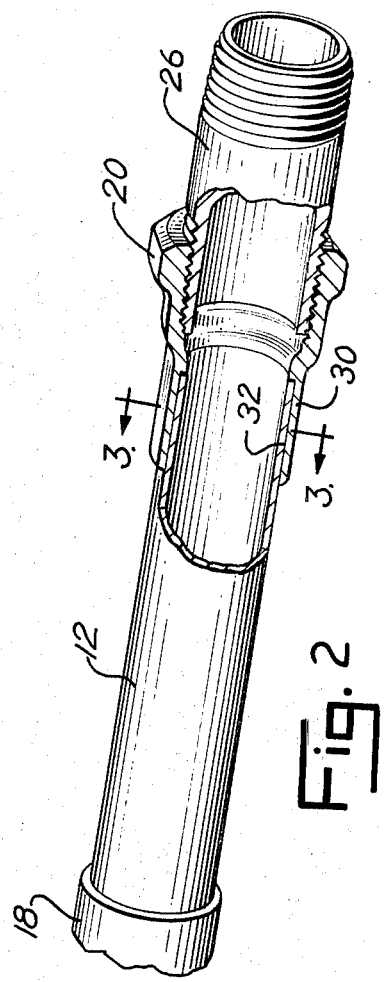

PIPING SYSTEM

Standard or conventional water piping systems for homes, apartments, and commercial and industrial buildings have consisted basically of three types of plumbing, the most preferred of these three normally being copper tubing and fittings with soldered joints, the second being galvanized iron pipe and threaded iron or bronze fittings, and the last, which is rapidly becoming an important segment of the trade, being the all plastic piping system normally using cemented joints, although there are plastic systems utilizing threaded metal joints along with cemented joints. The cost factor is the primary objection to the all copper piping system and, if the current trend continues, this system will become relatively expensive compared with the other two systems for the foreseeable future. The galvanized iron piping system has certain disadvantages primarily related to the difficulty of making threaded joints and the labor costs therefor on the job, and to the possibility of leaks and failure at the threaded joints, particularly at the thin portion at the bottom of the thread groove; however, this latter type of system has in the past been extensively used in place of the all copper system throughout the trade. In the plastic piping systems, economy is the primary advantage, particularly the relatively low cost of the materials; however, the time required for the cemented joints to reach minimum acceptable strength after completion often increases materially the labor costs in making an installation. It is therefore one of the principal objects of the present invention to overcome all or most of the disadvantages of the three prior standard or conventional piping systems and to provide an all metal system with strong soldered joints and at a cost substantially below the cost of comparable standard piping systems.

Another object of the invention is to provide a piping system in which the joints can quickly be made, without a setting or curing time required after completion for the joint to gain adequate strength before continuing with the installation of the system, and which has strong and durable joints and yet is relatively light in weight facilitating assembly of the various elements thereof during installation.

Still another object of the invention is to provide an all metal piping system which is capable of being readily integrated into the standard copper piping trade with the use of many of the same fittings and with the application of the same installation technique in producing soldered joints and in cutting the material to the required lengths.

A further object is to provide a piping system of the aforesaid type in which the piping consists of thin walled steel galvanized tubing and the joints consist of copper fittings soldered to the straight ends of the tubing using the conventional soldered joint, and in which the effect of dissimilar metal incompatibility is insignificant and inconsequential with respect to the durability and reliability of the system.

Additional objects and advantages of the invention will become apparent from the following description and accompanying drawing, wherein:

FIG. 1 is a perspective view of a section of a typical piping system embodying the present invention;

FIG. 2 is an enlarged perspective view of a portion of the section shown in FIG. 1 with a part broken away to better illustrate the nature of the present invention; and FIG. 3 is a transverse cross-sectional view of the portion shown in FIG. 2, the section being taken on line 3—3 of the latter figure.

Referring more specifically to the drawing, numeral 10 indicates generally a section of the piping system embodying the present invention, including sections 12, 14 and 16 of galvanized steel pipe, and a copper T-fitting 18 connected to one end of each of the three pipe sections. A copper adapter 20 is shown connected to the other end of pipe 12, a bronze valve 22 to the other end of pipe 14, and a copper ell 24 to the other end of pipe 16. A nipple 26 is threaded into adapter 20 and a pipe 28 is connected to one arm of ell 24. The valve and various fittings are representative of the type of connections that are made in a standard or conventional water piping system of a home, apartment, or commercial or industrial building. Although other types of valves and fittings may be included in the system, those shown herein will illustrate the nature of the present invention and its versatility with respect to an installation for any one of the foregoing types of buildings. While the fittings have been referred to herein as being copper, bronze may also be used in place of copper to satisfy requirements and/or meet specifications.

The piping system forming the subject matter of the present invention consists essentially in the use of plain end, galvanized thin walled steel pipe and copper and bronze fittings, adapters and valves joined to the pipe by a soldered or brazed joint. The system is principally applicable to steel pipe in sizes ranging from ⅜ inch through 4 inches, with thin walls of a thickness such as, for example, those given in the following table:

| Size, in. | Outside Diameter, in. (after galvanizing) | | Wall Thickness, in. | |
|---|---|---|---|---|
| | Min. | Max. | Nom. | Min. |
| ⅜ | .499 | .501 | .025 | .022 |
| ½ | .624 | .626 | .028 | .025 |
| ¾ | .874 | .876 | .032 | .028 |
| 1 | 1.1235 | 1.1265 | .035 | .031 |
| 1¼ | 1.3735 | 1.3765 | .042 | .037 |
| 1½ | 1.623 | 1.627 | .049 | .043 |
| 2 | 2.123 | 2.127 | .058 | .051 |
| 2½ | 2.623 | 2.627 | .065 | .057 |
| 3 | 3.123 | 3.127 | .072 | .063 |
| 4 | 4.123 | 4.127 | .095 | .083 |

The foregoing table applies to hot-dipped galvanized, welded steel pipe with plain ends for use with solder-type fittings and which may be produced by one of the processes consisting of open-hearth, electric furnace, basic oxygen or acid bessemer, and the steel used for the pipe should be of soft weldable quality. The steel pipe is galvanized with a uniform coating of zinc inside and outside which normally is not less than 1 8/10 ounces per square foot of surface, the weight of the coating being expressed in ounces per square foot calculated by dividing the total weight of zinc, inside plus outside, by the total area, inside plus outside, of the surface coated. The pipe meeting the foregoing requirements is satisfactory for standard installations of water, gas, steam and air lines in commercial and industrial buildings and in homes, apartment buildings, and mobile homes and recreational vehicles.

One of the primary advantages of the present system is that the joint between the pipe of the foregoing specifications, and copper and bronze fittings, adapters and valves is produced using essentially standard soldered or brazed joint technique. Since this technique is well known in the trade, a detailed discussion will not be set forth herein; however, for example, a joint between a copper fitting and pipe of the type mentioned above will be briefly described. The steps consist in cutting the galvanized pipe to the required length, cleaning the zinc coating at the end of the pipe, and then fluxing the parts and assembling the end of the pipe in the cup 30 of the fitting. Thereafter the joint is heated with a torch to the required temperature for making either the soldered or brazed joint and then applying the filler metal to the edge of the fitting cup. Since the dimensions of the pipe are maintained within relatively narrow limits, only a minimum amount of abrasive cleaning is performed on the pipe to retain the close fit necessary for an effective soldering operation and a strong and reliable joint. The composition of the soldering or brazing metal forms a metallurgical bond 32 with the galvanized coating on the pipe and with the copper or bronze and may be any one of the standard compounds used in conventional all copper pipe joints, such as, for example, 50 percent tin and lead, or 95 percent tin to 5 percent antimony.

Another significant advantage of my all metal system is the use of relatively thin steel pipe in combination with copper fittings, thus providing minimum heating time during the soldering or brazing operation and maximum heat dissipation upon completion of the operation. Since the steel or iron of the pipe has a substantially lower thermal conductivity than the copper of the fitting, the mass constituting the joint to be heated should be as little as possible, consistent with strength requirements, in order to minimize this difference in time for heating the parts to the required temperature and thereby to obtain an optimum union between the zinc of the galvanized pipe, the copper of the fitting and the soldering or brazing composition. Further, the thin walled steel pipe in combination with the copper fitting avoids delay which might otherwise result from heating and cooling of the parts during the assembly operation. The thickness of the wall of the steel pipe of the new system is normally substantially the same as the thickness of the wall of the fitting cup, which is appreciably thinner than standard galvanized steel pipe. Standard steel water piping would require a substantially longer period to heat and cool a joint and hence, if otherwise capable of being used in a system with copper fittings, would be impractical in that an appreciable delay would occur in making and completing each soldered or brazed joint.

By the use of the thin walled steel galvanized pipe in combination with the copper or bronze fittings and valves, an economical plumbing system has been devised which provides a fast joining operation comparable to that in all copper systems, and provides strong joints with proper soldered clearance for effective and complete capillary flow. The steel tubing is light in weight and easy to handle in making an installation, and the joint formed by the thin walled galvanized pipe and the copper or bronze fittings or valves provides a durable system which is virtually free of corrosion. The system can be readily and effectively used in place of all copper systems at a substantially lower cost, yet utilizing the same installation equipment and know-how. The new system is more reliable than plastic systems and may be competitive in cost in many installations.

Throughout the description, reference has been made to steel piping and copper and bronze fittings and valves. It is seen that the fittings and valves are of a more noble metal than the steel of the pipe and the zinc galvanized coating on the steel pipe. For the purpose of defining the relationship of these parts in the claims, reference is made to this order or classification of metals. Further, in order to simplify the definition of the invention and description of the subject matter in the claims, the term "fitting" unless otherwise indicated, will be used to refer to adapters, valves and similar fixtures which may be coupled to the steel pipe, as well as ells, tees, couplings, elbows and reducers normally considered within the purview of the term.

While several embodiments and modifications of the present piping system and joint involving a thin walled galvanized piping and copper or bronze fittings and valves, have been described in detail herein, various changes and further applications may be made without departing from the scope of the invention.

I claim:

1. A piping system comprising a thin walled steel pipe having a galvanized coating and a plain end, said coating extending along the entire interior and exterior cylindrical surfaces of said pipe, a fitting composed of a copper based metal and having a thin walled cup for receiving the plain end of said pipe, and a bonding material forming a metallurgical bond containing an alloy of zinc and iron between said steel pipe and said copper based metal, the diameter of said pipe ranging from ⅜ inches to 4 inches and the wall thicknesses thereof ranging between 0.022 and 0.095 inches.

2. A piping system as defined in claim 1 in which the galvanized coating on said pipe is essentially zinc and a soldering compound is used to form the metallurgical bond between the zinc coating and the fitting.

3. A piping system as defined in claim 1 in which the galvanized coating on said pipe is essentially zinc and a brazing compound is used to form the metallurgical bond between the zinc coating and the fitting.

4. A piping system as defined in claim 1 in which said fitting is copper.

5. A piping system as defined in claim 1 in which said fitting is bronze.

6. A piping system as defined in claim 1 in which the material used in forming said metallurgical bond consists essentially of 50 percent tin and 50 percent lead.

7. A piping system as defined in claim 1 in which the material used in forming said metallurgical bond consists essentially of 95 percent tin and 5 percent antimony.

* * * * *